United States Patent
Weber

(10) Patent No.: US 9,752,917 B2
(45) Date of Patent: Sep. 5, 2017

(54) MICROWAVE BARRIER AND METHOD OF RECOGNIZING AN OBJECT IN A MICROWAVE PATH

(71) Applicant: SICK AG, Waldkirch (DE)

(72) Inventor: Thomas Weber, Waldkirch (DE)

(73) Assignee: SICK AG, Waldkirch (DE)

( * ) Notice: Subject to any disclaimer, the term of this patent is extended or adjusted under 35 U.S.C. 154(b) by 522 days.

(21) Appl. No.: 14/163,164

(22) Filed: Jan. 24, 2014

(65) Prior Publication Data
US 2014/0210670 A1    Jul. 31, 2014

(30) Foreign Application Priority Data
Jan. 28, 2013   (DE) .................. 10 2013 100 817

(51) Int. Cl.
*G01F 23/28*   (2006.01)
*G01V 3/12*    (2006.01)
(Continued)

(52) U.S. Cl.
CPC ........ *G01F 23/284* (2013.01); *G01F 23/2845* (2013.01); *G01S 7/40* (2013.01);
(Continued)

(58) Field of Classification Search
CPC ... G01S 7/003; G01S 7/02; G01S 7/28; G01S 7/282; G01S 7/40; G01S 7/4004;
(Continued)

(56) References Cited

U.S. PATENT DOCUMENTS 4,752,778 A * 6/1988 Simpson .................. G01V 3/12
342/27
6,414,625 B1 7/2002 Kleman
(Continued)

FOREIGN PATENT DOCUMENTS

CN    101726343 A    6/2010
CN    102027337 A    4/2011
(Continued)

OTHER PUBLICATIONS

Examination Report issued Jan. 24, 2014, in counterpart German application No. 10 2013 100817,8.

*Primary Examiner* — Bernarr Gregory
(74) *Attorney, Agent, or Firm* — Nath, Godberg & Meyer; Jerald L. Meyer; Stanley N. Protigal

(57) ABSTRACT

A microwave barrier (10) is provided which has a first microwave unit (14a) having a microwave transmitter and a first antenna (16a) for transmitting a microwave signal and which has a second microwave unit (14b) having a microwave receiver and a second antenna (16b) for receiving the microwave signal and which also has an evaluation unit which is configured to recognize from the received microwave signal whether an object (17) is located on the microwave path (12) between the first microwave unit (14a) and the second microwave unit (14b). In this respect, the first microwave unit (14a) and the second microwave unit (14b) each have a radio frequency transceiver to transmit and to receive microwave signals and the radio frequency transceiver is part of an integrated digital module for wireless communication.

15 Claims, 2 Drawing Sheets

(51) Int. Cl.
*G01S 7/40* (2006.01)
*G01F 23/284* (2006.01)
*G01V 8/00* (2006.01)
G01F 23/00 (2006.01)
G01V 3/00 (2006.01)
G01S 7/00 (2006.01)
G01S 13/00 (2006.01)

(52) U.S. Cl.
CPC ............. *G01V 3/12* (2013.01); *G01V 8/005* (2013.01); *G01S 7/003* (2013.01)

(58) Field of Classification Search
CPC .... G01S 7/4008; G01S 7/4017; G01S 7/4021; G01S 13/003; G01S 13/02; G01S 13/06; G01S 13/08; G01S 13/50; G01S 13/52; G01S 13/56; G01S 7/024; G01S 7/025; G01V 3/12; G01V 8/005; G01F 23/22; G01F 23/28; G01F 23/284; G01F 23/2845; G01F 23/292; G01F 23/2921; G01N 22/00; A61B 5/0059
USPC ....... 342/21, 22, 27, 28, 118, 123, 124, 175, 342/195, 165–174, 350, 385
See application file for complete search history.

(56) References Cited

U.S. PATENT DOCUMENTS

| | | | |
|---|---|---|---|
| 6,490,066 B1 | 12/2002 | Korevaar | |
| 6,919,838 B2* | 7/2005 | Santhoff | A61B 5/0059 342/22 |
| 7,140,238 B2* | 11/2006 | Beauducel | G01F 23/2845 73/599 |
| 7,239,151 B2* | 7/2007 | Bailey | G01N 22/00 324/644 |
| 7,367,226 B2* | 5/2008 | Okamura | G01F 23/2845 324/639 |
| 7,482,969 B2* | 1/2009 | Huff | G01V 3/12 324/332 |
| 7,701,385 B2 | 4/2010 | Edvardsson | |
| 8,106,813 B2* | 1/2012 | Pillai | G01S 7/282 342/195 |
| 8,141,417 B2* | 3/2012 | Gibson | G01F 23/2845 324/639 |
| 8,248,293 B2* | 8/2012 | Kroning | G01S 7/025 342/118 |
| 8,654,002 B2* | 2/2014 | Lesturgie | G01S 13/003 342/126 |
| 2004/0189510 A1* | 9/2004 | Negro | G01S 13/56 342/28 |
| 2005/0221765 A1 | 10/2005 | Shen et al. | |
| 2007/0296626 A1 | 12/2007 | Gnedenko et al. | |

FOREIGN PATENT DOCUMENTS

| | | |
|---|---|---|
| DE | 3302731 A1 | 8/1984 |
| EP | 0898153 A1 | 2/1999 |
| EP | 0977020 A1 | 2/2000 |
| EP | 2180299 A1 | 4/2010 |
| GB | 2152333 | 7/1985 |

* cited by examiner

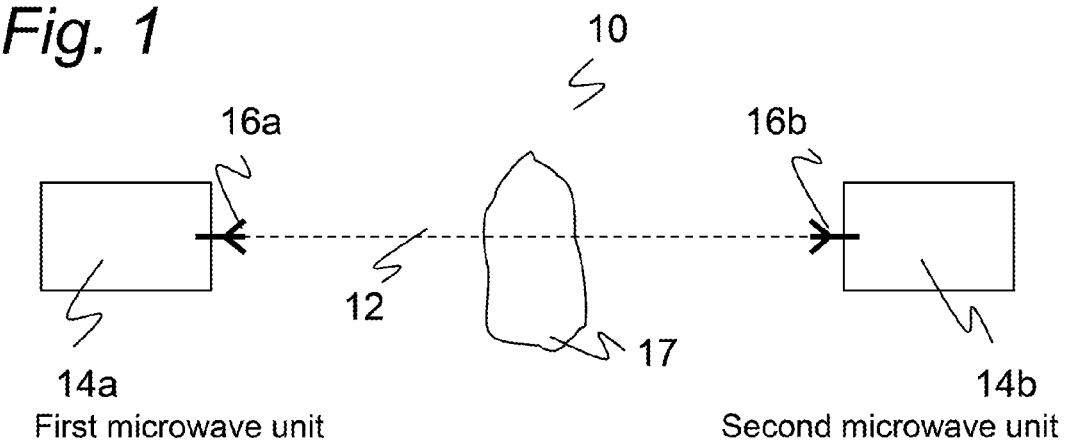
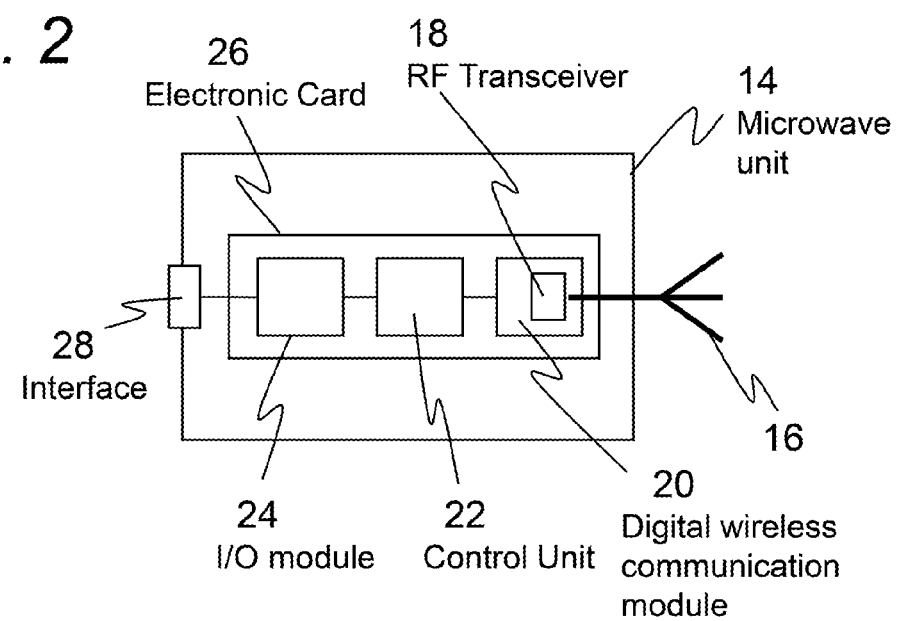

MICROWAVE BARRIER AND METHOD OF RECOGNIZING AN OBJECT IN A MICROWAVE PATH

FIELD OF THE INVENTION

The invention relates to a microwave barrier and to a method of recognizing an object in a microwave path by transmitting a microwave signal between a first microwave unit and a second microwave unit.

BACKGROUND

Light barriers are frequently used for the contactless recognition of objects. The optical spectrum is, however, not suitable for all applications, for instance in environments with severe contaminants. There are therefore areas of use in which a microwave barrier represents the more favorable choice. Microwaves not only penetrate through opaque small particles, but also through at least thin films of non-metallic objects and thus even allow a monitoring in closed containers. A microwave barrier in principle works like a light barrier: A microwave signal is transmitted at one side of the zone to be monitored and is received again at the opposite side. If an object enters into this microwave path, the received microwave signal changes and the presence of the object can be recognized by this.

A specific use for microwave barriers is the point level detection of media such as liquids or bulk goods in containers. The object to be recognized here is the medium which reaches the microwave path from a certain filling level or point level onward and thereby damps the microwave signal. The critical filling levels of overflow or no-load running are thus in particular monitored so that a regulation of the filling level can intervene in good time. A number of different alternatives are known for a point level determination, for instance tuning fork sensors, radar sensors, systems based on ultrasound or capacitive systems. Microwave barriers show advantages over these with respect to the robustness toward interference influences such as temperature, pressure, dust or noise.

Conventional microwave barriers, such as are known from DE 33 02 731 A1, are divided into a transmission unit and a reception unit. This first means that the microwave barrier comprises two different units which cannot be swapped over. In addition, in many respects, the association between the transmission unit and the reception unit must be ensured, above all when a plurality of microwave barriers are operated next to one another. For instance, an antenna design having a small transmission lobe is selected to achieve an alignment effect on the associated, oppositely disposed unit of the microwave barrier. Such antennas can take on large dimensions, which are disturbing in the assembly, and a very precise assembly and alignment of the units is simultaneously required.

In addition, parameters such as the carrier frequency, the modulation frequency or the polarization direction in the transmission unit and in the reception unit also have to be set so that the associated units recognize one another and are influenced as little as possible by external units of other microwave barriers. Such settings can only be made with an exact understanding of the operation of the microwaves and the required time effort for putting into operation is even increased for corresponding technical personnel. The named restrictions for ensuring an unambiguous association also have an effect on the arrangement options of the units which should, for example, have sufficient distance from one another to avoid incorrect associations. Since there is no higher ranking technical information link between the conventional transmission unit and reception unit, interference influences such as a reducing transmitter power or multipath propagation are difficult to control.

SUMMARY

It is therefore the object of the invention to provide a microwave barrier having a simplified design and an improved measurement behavior.

This object is satisfied by a microwave barrier and by a method of recognizing an object in a microwave path using first and second microwave units respectively having a microwave transmitter and antenna, and a microwave receiver and antenna. A microwave path is present between the first microwave unit and the second microwave unit, and an evaluation unit recognizes from the received microwave signal whether an object is located on the microwave path. The first and the second microwave units each have a radio frequency transceivers to transmit and to receive microwave signals. The radio frequency transceiver is part of an integrated module for wireless communication.

In another aspect, an object in a microwave path is recognized by transmitting a microwave signal between first and a second microwave units. The microwave signal is transmitted and received bidirectionally by means of a radio frequency transceiver from the first microwave unit to the second microwave unit and vice versa. The radio frequency transceiver provides radio frequency processing, which takes place in an integrated module for wireless communication and on the basis of processes which are implemented in the module for wireless communication.

In this respect, the technique starts from the basic idea of not dividing the microwave units spanning the microwave path into a transmitter and a receiver, but rather to configure both microwave units in the same manner among one another as both a transmitter and a receiver. This also allows a bidirectional communication for coordination, for examination and for a data exchange. In this respect an integrated module, in particular a digital module or a mixed-signal module, is used as a transceiver for transmitting and receiving which has not been designed and produced for a microwave barrier, but rather for wireless communication, for example in the RFID sector or for local networking. Such modules offer an abundance of functions which are admittedly not intended for microwave barriers, but which can very easily be used to advantage.

The invention has the advantage that microwave units of the same kind can be used everywhere instead of dedicated transmitters and receivers. The manufacturing, handling and storage are thereby simplified. The integrated radio frequency transceivers are extremely inexpensive and are commercially available and thus allow small manufacturing costs, short development cycles and the automatic link to the continuous improvements in wireless communications technology without any greater development activity related to the microwave barrier. Due to the extremely low power take-up of the transceiver modules optimized for portable devices, the microwave barrier also copes with applications with a low supply, for instance, a two-wire HART terminal, o optionally even with a battery.

The wireless communication is moreover designed for use under interference influences and for weak signals. The microwave barrier profits from this in the form of a high measurement sensitivity for thin objects, small media paths run through and small dielectricity constants of the objects to be detected. The demands on the alignment and position of the microwave units are considerably smaller in comparison with a conventional microwave barrier. For the recognition and dedicated association of a specific signal is also one of the typical tasks in wireless communication so that the module already brings along corresponding solutions to find and associate the right microwave signal under more difficult conditions. Mutual influence phenomena of a plurality of microwave barriers are thus so-to-say automatically taken into account and eliminated. Finally, an increased stability with respect to drifting, including temperature fluctuations and an aging-induced power drop of the transmitted signal, can be provided via the bidirectional communication of corresponding changes.

The radio frequency transceivers are preferably designed for the 2.4 GHz ISM frequency band (industrial, scientific and medical band). An ISM frequency band can be utilized without permission; that is there are no restrictions anywhere in the world through technical radio licensing. At the same time, a device which is operated in an ISM band should be resistant to interference because other transmitters have to be expected in the band at all times. A module for wireless communication can, however, inherently cope with this problem.

The evaluation unit is preferably designed to recognize an object located on the microwave path by an intensity evaluation of the microwave signal. An object changes the damping of the microwave signal in dependence on its dimensions in the direction of the microwave path and on its dielectric properties. A module for wireless communication delivers this information as an RSSI (received signal strength indicator), but also processed in the form of a quality factor for the connection quality, for instance an LQI (link quality indicator). Evaluations which usually serve to evaluate the quality and stability of a communication link are therefore used here in a new function for the conclusion of an object on the microwave path.

The evaluation unit is preferably designed for a teaching mode in which intensity values for a free microwave path and/or for a microwave path having a known object are determined and stored. Adapted reference values are thus available to recognize a new object or a change in the microwave path in operation. A switching threshold can also immediately be determined from the taught intensity values, with the storing of the intensity values then taking place in the form of the switching thresholds.

The evaluation unit is preferably designed for a test mode in which no microwaves are transmitted. For this purpose, a check is made with a deactivated transmitter of the one microwave unit whether the oppositely disposed microwave unit measures an intensity drop correspondingly to be expected. Malfunctions of the radio frequency transceiver or of electronics associated therewith can be recognized by this.

The module is preferably integrated with the evaluation unit on an electronic card. This makes possible a very simple and inexpensive design of the microwave barrier. Additional electronics, for example an I/O module for controlling an interface, can likewise be accommodated on the same electronic card.

The first antenna and/or the second antenna preferably have a non-directional transmission. Non-directional here also includes a comparatively wide antenna lobe which is admittedly limited, for example, to increase the range, and which can be roughly aligned with respect to the oppositely disposed microwave unit, but which considerably outshines it. A non-directional transmission accordingly does not necessarily mean an omnidirectional transmission in this connection, but rather that the antenna lobe can also impact non-associated microwave units.

A coexistence strategy is preferably implemented in the module with which a microwave signal and a microwave unit are unambiguously associated with one another. The unambiguous device recognition required in wireless communication is anyway provided in corresponding modules and is utilized here in order also to identify an associated microwave unit without alignment and restriction of the antenna lobes. To provide corresponding communication channels for mutual evasion, properties of the microwave signal are varied, for example by a frequency change, encoding modulation or frequency spreading (FHSS, frequency hopping spread spectrum; DSSS, direct sequence spread spectrum). A number of microwave units can thereby transmit in parallel and can selectively be associated in pairs or in other groups. The parameters within the coexistence strategy are, for example, deduced from a serial number or device number for an unambiguous identification of a microwave unit.

At least one further microwave unit is preferably provided which spans at least one further microwave path for recognizing objects in the microwave path with the first microwave unit and/or with the second microwave unit. Such arrangements of a plurality of microwave units can be conceived in innumerable constellations. This is made possible because the individual microwave units can both transmit and receive and not only transmit in a directed manner to an opposite device, but can rather reach microwave units in different positions with a wider antenna lobe. As an example, one microwave unit is mounted on the one side of a monitored zone and a plurality of microwave units are mounted spaced apart from one another opposite thereto. A kind of microwave grid thus results. Such a grid can naturally also be generated by a plurality of pairs of microwave units. Such a classical grid, however, requires twice the number of microwave units with respect to the number to be monitored, whereas in the just-described advantageous embodiment of the invention a single additional microwave unit is sufficient.

At least one of the microwave units preferably has an interface for transmitting data from the microwave barrier and/or into the microwave barrier. This interface is addressed, for example, via an I/O link or another communication protocol. Particularly preferably, at least one microwave unit does not have its own interface, but rather exchanges data over the microwave path and the interface of a different microwave unit. In this respect, the microwave path is used with the bidirectional connection between the microwave units as an air interface or wireless I/O link bridge. A microwave unit linked in this manner then no longer has to be connected to a wired data line. It is thus sufficient in the constellation described in the previous paragraph with one microwave unit on the one side and a plurality of microwave units on the other side of a monitored zone to connect a single microwave unit in a wired manner to be able to address all microwave units.

In a preferred further development, a filling level sensor or point level monitor for determining the filling level of a medium in a container has at least one microwave barrier in accordance with the invention. As already mentioned in the introduction, the object to be recognized can also be a medium, for example a liquid or a bulk good, in a container. A microwave barrier recognizes whether a monitored point level is exceeded or fallen below with reference to its installation height. In this respect, a conclusion can also be drawn within certain limits on a filling level between the discrete installation heights of the microwave units by tracking the time history of the point level breaches, by a numerical evaluation instead of a threshold value evaluation of the received microwave intensity and by the common processing of the signals of a plurality of microwave units at different installation heights.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in:

FIG. 1 a schematic cross-sectional view of a microwave barrier;

FIG. 2 a block diagram of a microwave unit of the microwave barrier in accordance with FIG. 1;

DETAILED DESCRIPTION

Figure 3:
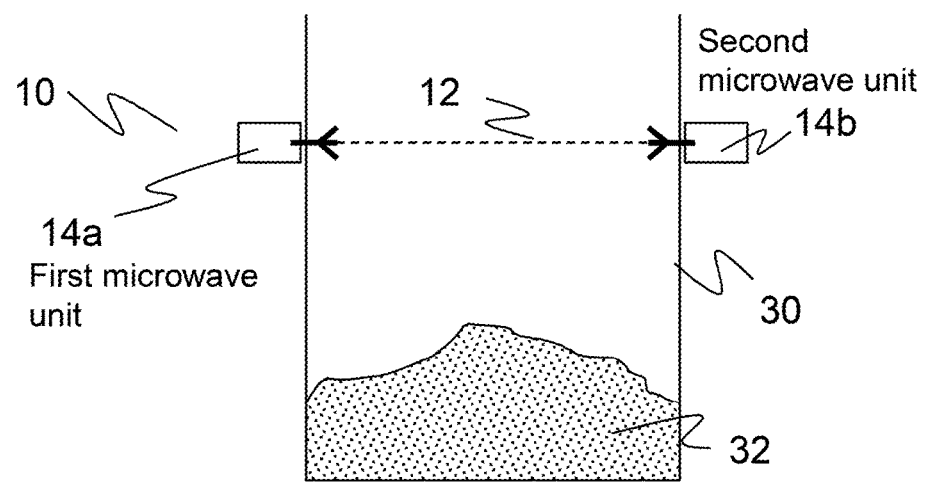
FIG. 3 a cross-sectional representation of the attachment of a microwave barrier in accordance with FIG. 1 to a container for monitoring the filling level or point level.

FIG. 1 shows a schematic cross-sectional view of a microwave barrier 10. A microwave signal is transmitted on a microwave path 12 from a first microwave unit 14a having an antenna 16a and is received by a second microwave unit 14b having a second antenna 16b, or vice versa. If the microwave signal passes through an object 17 on the microwave path, it is damped in dependence on the width of the object 17 and on its dielectric properties. It can be recognized by this where the microwave path 12 is free or whether an object 17 is located there.

FIG. 2 shows a microwave unit 14 in a block diagram. In this respect, both microwave units 14a-b are of the same construction so that FIG. 2 can selectively be understood as a representation of the first microwave unit 14a or of the second microwave unit 14b. An integrated radio frequency transceiver 18 is connected to the antenna 16 to transmit or receive a microwave signal. The radio frequency transceiver 18 is part of a digital module 20 or of a mixed-signal module for wireless bidirectional communication, for example a commercially available low-cost module from the wireless/handheld sector.

The digital module 20 is integrated on an electronic card together with an evaluation and control unit 22 and an I/O module 24. An interface 28 can be address via the I/O module 24 by means of an I/O link or any other connection to parameterize the microwave unit 14 or to output data. Alternatively, the parameterization and/or data output takes place via operating elements and a display.

The microwave barrier 10 can be used generally for the presence recognition of objects 17. In a preferred embodiment, the microwave barrier 10 is used for monitoring a filling level or point level as is illustrated in FIG. 3 in a cross-sectional representation of a container 30 having a medium 32 located therein, for example a liquid or, as shown, a bulk good, and having a microwave barrier 10 mounted at the container wall. In the following, individual features of the microwave barrier 10 as well as their measurement processes will be described for this example of point level monitoring; however, they can mostly be transferred to a general presence recognition when the influences of the object 17 and the medium 32 on the microwave signal are allowed to correspond to one another.

For a point level measurement, the radio frequency transceiver 18 of a microwave unit 14a-b generates a microwave signal which is received in the oppositely disposed microwave unit 14b-a. To promote a small energy consumption and nevertheless to achieve a high range, the frequency should be selected as low as possible. The ISM band at 2.4 GHz for which a variety of integrated solutions have been developed can advantageously be used for this purpose so that suitable digital modules 20 are available. The low radio frequency in comparison with conventional systems at 2.4 GHz as such requires larger antennas. At first glance, disadvantages thus result in the antenna design which are, however, compensated by the signal processing proposed here and by the lower demands on the antenna characteristics. The antennas 16a-b are not optimized for designing the transmission and reception characteristics in a manner as small and narrow as possible, but a wider transmission lobe is rather generally allowed. This installation is thus facilitated since the microwave units 14a-b no longer have to be precisely aligned to one another as in accordance with the prior art.

The evaluation unit 22 generates a switching signal which is triggered by medium 32 in the microwave path 12. With the switching signal, the microwave barrier outputs the information whether the monitored point level has been reached or not. For this purpose, a signal damping is evaluated whose basis forms a quality characteristic provided by the digital component. Conceivable measures are the so-called received signal strength indicator (RSSI) or the link quality indicator (LQI), as implemented by IEEE 802.15.4. The intensity is therefore preferably not directly evaluated, but rather a preprocessing anyway provided in the digital module 20 is utilized for a simply comparable quality characteristic. The switching signal can then be derived from this information on the properties of the communication channel between the microwave units 14a-b.

In an advantageous further development of the invention, not only a switching signal, but rather a continuous measurement signal is derived for a filling level in a region of the container 30 in which the microwave signal is propagated. In this respect, not only the direct microwave path 12 therefore plays a role, but rather multipath propagations also have an effect which can even be of aid for the continuous filling level measurement of this application. A constantly changing damping of the microwave signal by a constant change of the filling level occurs, for example, with bulk goods as the medium 32 which form a conical heap on tipping.

A great advantage on the use of a digital module 20 is that solutions for coexistence strategies are already integrated for wireless communication, for example frequency hopping spread spectrum (FHSS), pulse sequence codings or direct sequence spread spectrum (DSSS), for instance in order to realize CSMA/CA on top as layer 2 protocol of the ISO/OSI model. The protocol which the digital module 20 provides for communication connections can thus be utilized to carry out an unambiguous association between microwave units 14a-b. A great number of microwave barriers 10 or microwave units 14*a*-*b* can thereby be operated in parallel without mutually influencing one another in their measurement work.

The parameterization of the switching thresholds takes place be predefining a damping. For this purpose, for example, the quality characteristic of the microwave connection between the microwave units is determined without medium 32 in the container 30 or with a sufficient spacing of the medium 32 from the microwave path 12. Starting from this, the switching threshold is derived from the desired sensitivity of the system, with there being a physically induced reciprocal dependence between the sensitivity and the required measurement time.

The two microwave units 14*a*-*b* are designed with respect to one another in identical hardware at least to the extent that they satisfy both roles as a transmitter and receiver. Switching information is thus available at the interfaces 28 of both microwave units 14*a*-*b*. Since the microwave units 14*a*-*b* can communicate with one another over the microwave connection, it is sufficient if only one microwave unit 14*a*-*b* has an interface 28. Parameterizations such as measured data, that is, for example, the sensitivity, the thresholds, the response delay or the switching states can be swapped between the microwave units 14*a*-*b* via this air interface. In principle, the microwave barrier 10 can also be utilized as a communication connection for any other data. If, for example, the microwave units 14*a*-*b* are integrated into a higher ranking system by means of an I/O link or another protocol, the microwave connection can be utilized as an I/O link bridge or a bridge according to the other protocol between components of this higher ranking system.

To realize a safety system with the microwave barrier 10 and a control suitable for this purpose, an additional switch input, not shown, for example in accordance with IEC61131, can be provided via which the transmission function of the respective microwave unit 14*a*-*b* can be deactivated. A system test for ensuring the error-free functionality is thus made possible. The temporary deactivation for test purposes should remain independent of the normal information processing, for instance by an independent hardware switching which interrupts or short-circuits the radio frequency signal. Since then the communication connection breaks down, the higher ranking control will determine a change of the switch signal with an otherwise free propagation path and can thus check the system.

In order to detect objects 17 at a plurality of positions or to monitor a plurality of point levels of a medium 32, a plurality of microwave barriers 10 can be arranged parallel with one another. As discussed a multiple of times above, coexistence strategies of the digital module 10 then provide that the association of the different microwave units 14 is maintained in this respect.

There is, however, also an alternative with a smaller apparatus effort to a parallel multiple arrangement of microwave barriers 10. For unlike with the strictly pair-wise association of transmitter and receiver in accordance with the prior art, microwave units 14 can also span a plurality of microwave paths due to their bidirectional transmission and reception functions.

Figure 4:
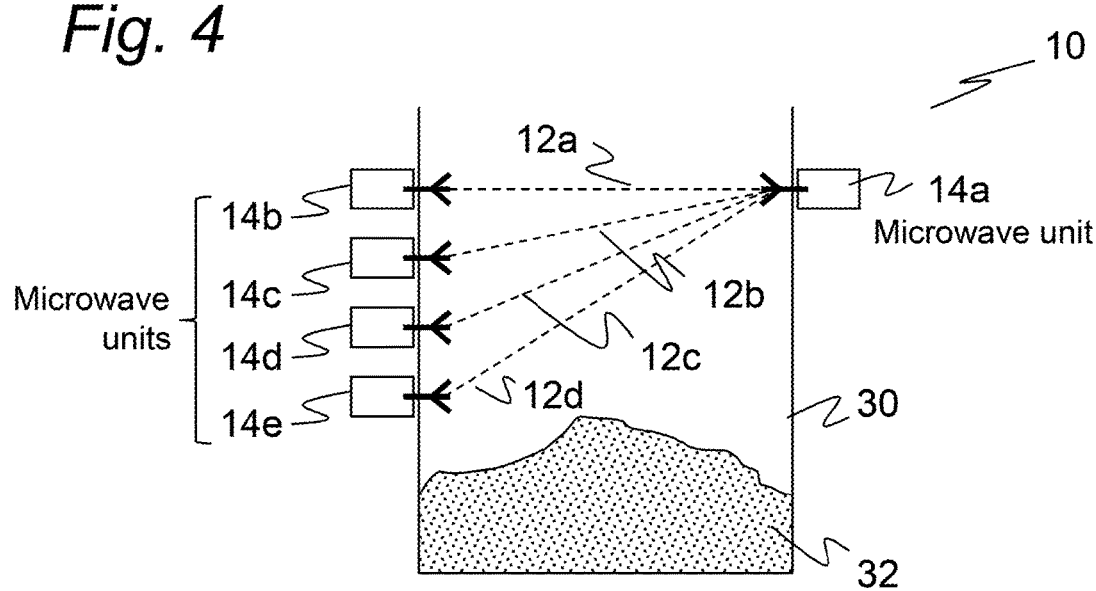
FIG. 4 a cross-sectional representation of the attachment of another embodiment of a microwave barrier with additional microwave units to a container for monitoring the filling level or point level.

FIG. 4 shows an example for a microwave barrier 10 having a plurality of microwave units 14*a*-*e* as point level monitors for a plurality of point levels of a medium 32. In this respect, only one single microwave unit 14*a* is mounted on one side of the container 32, preferably at the highest filling level to be monitored, and a plurality of microwave units 14*b*-*e*, four in this example, are mounted on the other side. The installation height of the plurality of microwave units 14*b*-*e* corresponds to the filling levels to be monitored, with a deviation being able to result between the installation height and the filling level to be monitored due to the oblique direct microwave paths 12*a*-*d*, said deviation then being taken into account for the actual installation height. Due to the wide transmission, almost omnidirectional in the extreme case, the microwave signal of the individual microwave units 14*a* on the one side is received by all the microwave units 14*b*-*e* on the other side, and vice versa. In this respect, the plurality of microwave units 14*b*-*e* are parameterized so that they are associated with the individual microwave unit 14*a*. In comparison with a plurality of microwave barriers mounted in parallel, the number of microwave units 14 is thus substantially reduced so that not only microwave units 14 are dispensed with, but also installation costs, flanges, and the like.

It is particularly useful in this embodiment if only the individual microwave unit 14*a* has an interface 28 and the plurality of microwave units 14*b*-*e* communicate via the microwave paths 12*a*-*b* and the individual microwave unit 14*a*. All information thus runs together in the individual microwave unit 14*a* and can be input and taken up there. The wiring effort for integrating the microwave units 14*b*-*e* into a communication system is thus dispensed with.

The invention claimed is:

1. A microwave barrier device (10) comprising:
a first microwave unit (14*a*) having a microwave transmitter and a first antenna (16*a*) for transmitting a microwave signal;
a second microwave unit (14*b*) having a microwave receiver and a second antenna (16*b*) for receiving the microwave signal;
a microwave path present between the first microwave unit and the second microwave unit; and
an evaluation unit (22) configured to recognize from the received microwave signal whether an object (17, 32) is located on the microwave path (12),
wherein the first microwave unit (14*a*) and the second microwave unit (14*b*) each comprise an integrated module (20) with a radio frequency transceiver (18) to transmit and to receive the microwave signals, the radio frequency transceivers (18) each provided as part of its respective integrated module (20) designed for wireless communication unrelated to use as a microwave barrier,
and wherein the integrated module (20) provides an evaluation which assesses quality and stability of a communication connection and the evaluation unit (22) uses the evaluation from the integrated module (20) to extract information about the intensity of the received microwave signals for drawing a conclusion about an object on the microwave path (12), and in that a coexistence strategy is implemented on the module by means of which a microwave signal and a microwave unit can unambiguously be assigned with one another, the coexistence strategy comprising associating the received microwave signal with the microwave unit.

2. The microwave barrier device (10) in accordance with claim 1, wherein the radio frequency transceivers (18) are configured for the 2.4 GHz ISM frequency band.

3. The microwave barrier device (10) in accordance with claim 1, wherein the evaluation unit (22) is configured to recognize an object (17, 32) located on the microwave path (12) by an intensity evaluation of the microwave signal.

4. The microwave barrier device (10) in accordance with claim 1, wherein the evaluation unit (22) is configured for a teaching mode in which intensity values for a free microwave path (12) and/or for a microwave path (12) having a known object (17, 13) are determined and stored and at least one switching threshold is derived therefrom.

5. The microwave barrier device (10) in accordance with claim 1, wherein the module (20) is integrated on an electronic card (26) with the evaluation unit (22).

6. The microwave barrier device (10) in accordance with claim 1, wherein at least one of the first antenna (16a) and the second antenna (16b) has a non-directional transmission.

7. The microwave barrier device (10) in accordance with claim 1, wherein the coexistence strategy is one of a frequency change and a frequency spread implemented in frequency spreading.

8. The microwave barrier device (10) in accordance with claim 1, wherein at least one further microwave unit (14c-e) is provided which spans at least one further microwave path (12b-d) with at least one of the first microwave unit (14a) and the second microwave unit (14b) for the recognition of objects (17, 32) in the microwave path (12b-d).

9. The microwave barrier device (10) in accordance with claim 1, wherein at least one of the microwave units (14a-e) has an interface (28) for transmitting data from the microwave barrier device (10) and/or into the microwave barrier device (10).

10. The microwave barrier device (10) in accordance with claim 9, wherein at least one microwave unit (14a-e) does not have its own interface (28), but rather exchanges data via the microwave path (12a-d) and the interface (28) of another microwave unit (14a-e).

11. A microwave barrier device (10) comprising:
a first microwave unit (14a) having a microwave transmitter and a first antenna (16a) for transmitting a microwave signal;
a second microwave unit (14b) having a microwave receiver and a second antenna (16b) for receiving the microwave signal;
a microwave path present between the first microwave unit and the second microwave unit; and
an evaluation unit (22) configured to recognize from the received microwave signal whether an object (17, 32) is located on the microwave path (12),
wherein the first microwave unit (14a) and the second microwave unit (14b) each comprise an integrated module (20) with a radio frequency transceiver (18) to transmit and to receive the microwave signals, the radio frequency transceivers (18) each provided as part of its respective integrated module (20) designed for wireless communication unrelated to use as a microwave barrier,
wherein the evaluation unit (22) is configured to recognize an object (17, 32) located on the microwave path (12) by an intensity evaluation of the microwave signal,
and wherein the intensity evaluation of the microwave signal comprises an evaluation of one of received signal strength indicator (RSSI) and a quality factor for a connection quality.

12. A microwave barrier device (10) comprising:
a first microwave unit (14a) having a microwave transmitter and a first antenna (16a) for transmitting a microwave signal;
a second microwave unit (14b) having a microwave receiver and a second antenna (16b) for receiving the microwave signal;
a microwave path present between the first microwave unit and the second microwave unit; and
an evaluation unit (22) configured to recognize from the received microwave signal whether an object (17, 32) is located on the microwave path (12),
wherein the first microwave unit (14a) and the second microwave unit (14b) each comprise an integrated module (20) with a radio frequency transceiver (18) to transmit and to receive the microwave signals, the radio frequency transceivers (18) each provided as part of its respective integrated module (20) designed for wireless communication unrelated to use as a microwave barrier,
and wherein the evaluation unit (22) is configured for a teaching mode in which intensity values for a free microwave path (12) and/or for a microwave path (12) having a known object (17, 13) are determined and stored.

13. A microwave barrier device (10) comprising:
a first microwave unit (14a) having a microwave transmitter and a first antenna (16a) for transmitting a microwave signal;
a second microwave unit (14b) having a microwave receiver and a second antenna (16b) for receiving the microwave signal;
a microwave path present between the first microwave unit and the second microwave unit; and
an evaluation unit (22) configured to recognize from the received microwave signal whether an object (17, 32) is located on the microwave path (12),
wherein the first microwave unit (14a) and the second microwave unit (14b) each comprise an integrated module (20) with a radio frequency transceiver (18) to transmit and to receive the microwave signals, the radio frequency transceivers (18) each provided as part of its respective integrated module (20) designed for wireless communication unrelated to use as a microwave barrier,
and wherein the evaluation unit (22) is configured for a test mode in which no microwaves are transmitted.

14. A filling level sensor or point level monitor for determining the filling level of a medium (32) in a container (30) with at least one microwave barrier (10) comprising:
a first microwave unit (14a) having a microwave transmitter and a first antenna (16a) for transmitting a microwave signal;
a second microwave unit (14b) having a microwave receiver and a second antenna (16b) for receiving the microwave signal;
a microwave path present between the first microwave unit and the second microwave unit; and
an evaluation unit (22) configured to recognize from the received microwave signal whether an object (17, 32) is located on the microwave path (12),
wherein the first microwave unit (14a) and the second microwave unit (14b) each comprise a radio frequency transceiver (18) to transmit and to receive microwave signals, the radio frequency transceiver (18) provided as part of an integrated module (20) designed for wireless communication unrelated to use as a microwave barrier,
and wherein the integrated module (20) provides an evaluation which assesses quality and stability of a communication connection and the evaluation unit (22) uses the evaluation from the integrated module (20) to extract information about the intensity of the received microwave signals for drawing a conclusion about an object on the microwave path (12), and in that a coexistence strategy is implemented on the module by means of which a microwave signal and a microwave unit can unambiguously be assigned with one another, the coexistence strategy comprising associating the received microwave signal with the microwave unit.

15. A method of recognizing an object in a microwave path (12) by transmitting a microwave signal between a first microwave unit (14a) and a second microwave unit (14b), the method comprising the steps of:

using an integrated module (20) in each of the first and second microwave units (14a, 14b), the integrated modules (20) each transmitting and receiving the microwave signal bidirectionally by means of a radio frequency transceiver (18) from the first microwave unit (14a) to the second microwave unit (14b) and vice versa by means of a high frequency transceiver (18) and wherein it is detected by an intensity evaluation of the microwave signal whether an object is located on the microwave path between the first microwave unit (14a) and the second microwave unit (14b); and using the radio frequency transceiver (18) to process the microwave signals, wherein the step of processing the microwave signals takes place in an integrated module (20) for wireless communication and on the basis of processes implemented in the module (20) designed for wireless communication unrelated to use as a microwave barrier, and wherein the integrated module (20) provides an evaluation which assesses quality and stability of a communication connection and the evaluation unit (22) uses the evaluation from the integrated module (20) to extract information about the intensity of the received microwave signals for drawing a conclusion about an object on the microwave path (12), and in that a coexistence strategy is implemented on the module by means of which a microwave signal and a microwave unit can unambiguously be assigned with one another, the coexistence strategy comprising associating the received microwave signal with the microwave unit.

* * * * *